United States Patent Office 3,450,491
Patented June 17, 1969

3,450,491
PREPARATION OF $MCr_3O_8$, WHERE M IS AN ALKALI METAL, FROM $CrO_3$, $Cr_2O_3$ AND $M_2Cr_2O_7$
Joseph H. Balthis, Jr., Mendenhall, Pa., assignor to E. I. du Pont de Nemours and Company, Wilmington, Del., a corporation of Delaware
No Drawing. Original application Dec. 14, 1965, Ser. No. 513,841. Divided and this application Aug. 1, 1968, Ser. No. 749,294
Int. Cl. C01g 37/02
U.S. Cl. 23—56      7 Claims

ABSTRACT OF THE DISCLOSURE

Described and claimed is the novel process for making the known alkali metal chromates $MCr_3O_8$, e.g., $KCr_3O_8$, by heating a mixture of $CrO_3$, $Cr_2O_3$ and an alkali metal dichromate at 170–400° C. The compounds of the formula $MCr_3O_8$ are useful in the synthesis of ferromagnetic chromium oxide.

RELATED APPLICATION

This application is a division of my copending application, Ser. No. 513,841, filed Dec. 14, 1965.

BACKGROUND OF THE INVENTION

Field of the invention

This invention relates to, and has as its principal object provision of, a novel process for making the known alkali metal chromium oxides containing the $Cr_3O_8$ grouping, useful for preparing ferromagnetic chromium oxide.

Description of the prior art

The known alkali metal chromium oxides, $MCr_3O_8$, can be made as described by Wilhelmi, Acta. Chem. Scand. 12, 1965 (1958), and by Suchow et al., J. Am. Chem. Soc. 74 1678 (1952), by reaction of $CrO_3$ with alkali metal dichromates at atmospheric or elevated pressure, viz, $$8CrO_3 + 2M_2Cr_2O_7 \rightarrow 4MCr_3O_8 + 3O_2 \qquad (1)$$

M being lithium, sodium, potassium, rubidium or cesium. The use of the compounds $MCr_3O_8$ in preparing ferromagnetic chromium oxide is disclosed and claimed in my above-mentioned patent.

DESCRIPTION OF THE INVENTION

In accordance with the present invention, it has now been discovered that $MCr_3O_8$ can be obtained in unusually finely divided physical form, particularly suitable for conversion to high coercivity $CrO_2$, by heating a mixture of $CrO_3$, $Cr_2O_3$, and an alkali metal dichromate for 0.1–12 hours at 170–400° C. and a pressure ranging from atmospheric or below to 1000 atmospheres or higher. The reaction involved is believed to be represented by the following equation:

$$2CrO_3 + Cr_2O_3 + M_2Cr_2O_7 \rightarrow 2MCr_3O_8 \qquad (2)$$

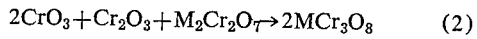

When the reaction is conducted at atmospheric pressure or below, use of anhydrous reactants is not essential since any water initially present escapes during early stages of the heating cycle. Under superatmospheric pressure, however, the water content of the reaction mixture is important and in no case should the proportion of water present exceed an amount equivalent to two moles per mole of dichromate.

Anhydrous and dihydrated alkali metal dichromates or mixtures thereof can be used at 270–350° C. (and pressures of 1–1000 atmospheres), but at higher temperatures, for example, 400° C. (1000 atmospheres), substantially anhydrous dichromate is required for production of high quality $MCr_2O_8$. For economic reasons, it is preferred to prepare $MCr_3O_8$ at atmospheric pressure. The $CrO_3$, $Cr_2O_3$, and the dichromate are preferably initimately mixed before reaction, and may be brought to reaction temperature rapidly. A several-fold excess of dichromate over that required by Equation 2 is normally employed since the presence of water-soluble dichromate facilitates washing the black, water-insoluble $MCr_3O_8$ from the reactor.

In preparing $MCr_3O_8$ by this novel process, a reactive form of $Cr_2O_3$ is used. This may be prepared by precipitation from aqueous chromium(III) nitrate or chromium(III) chloride solution using ammonium hydroxide. The precipitated hydrous chromium(III) oxide is thoroughly washed with water to remove nitrate or chloride anions and is then heated or calcined at substantially atmospheric pressure, i.e., at a pressure in the range of 0.5–5 atmospheres and a temperature of 200–1000° C. This heating is preferably carried out under oxidizing conditions, i.e., in the presence of air or oxygen, to yield a product which may in certain cases contain chromium with an average valence above 3 but less than 4. Periods of time ranging from a few minutes, e.g., 10 minutes, to several hours, e.g., 24 hours, are usually sufficient for the heating step.

Depending upon the reaction conditions selected, the preparation of $MCr_3O_8$ may be effected in open vessels or in closed pressure vessels. The preparation is preferably carried out in an atmosphere of air or oxygen though other chemically inert gases may be used. Reaction in flowing oxygen is advantageous.

There follow some examples which illustrate the process of the invention in more detail.

EXAMPLES A–L

These examples illustrate the preparation of alkali metal chromium oxides, $MCr_3O_8$. The reactants employed, the reaction conditions, and the characteristics of the products are described in the table. Examples J. K and L are controls which show the importance of controlling the amount of water used in the claimed process: if 0.5 g. of $H_2O$ is added to the reactant mixture of Example C (Example J), or 0.6 g. to the mixture of Example D (Example K), the product is $CrO_2$. Similarly, use of $Na_2Cr_2O_7 \cdot 2H_2O$ in place of $K_2Cr_2O_7$ of Example D (Example L) results in formation of $CrO_2$.

TABLE.—PREPARATION OF $MCr_3O_8$

| Example No. | Reactants (g.) | | | Reaction Conditions | | | | Maximum Particle Size (Microns) (Length Width) |
|---|---|---|---|---|---|---|---|---|
| | $CrO_3$ | $Cr_2O_3$ | $M_2Cr_2O_7$ | Temp., °C. | Pressure, Atm. | Time in Hrs. | Product | |
| A | 4 | 2 | $Na_2Cr_2O_7 \cdot 2H_2O$, 15 | 225 | 135–233 | 12 | $NaCr_3O_8$ | (Not resolved under 60-fold magnification). |
| B | 2 | 1 | $Na_2Cr_2O_7$, 5 | 350 | 500 | 6 | $NaCr_3O_8$ | 3 (Non-acicular, angular particles). |
| C | 2 | 1 | $Na_2Cr_2O_7 \cdot 2H_2O$, 5 | 350 | 1,000 | 6 | $NaCr_3O_8$ | 7, 4. |
| D | 2 | 1 | $K_2Cr_2O_7$, 5 | 400 | 1,000 | 6 | $KCr_3O_8$ | 10, 3. |
| E | 2 | 1 | $Na_2Cr_2O_7$, 5 | 350 | 500 | 6 | $NaCr_3O_8$ | 11, 5. |
| F | 4 | 2 | $Na_2Cr_2O_7 \cdot 2H_2O$, 10 | 333 | 1 | 6 | $NaCr_3O_8$ | |
| G | 4 | 2 | $Na_2Cr_2O_7 \cdot 2H_2O$, 10 | 400 | 1 | 6 | $NaCr_3O_8$ | |
| H [1] | 4 | 2 | $Na_2Cr_2O_7 \cdot 2H_2O$, 10 | 200 | 1 | 5.5 | $NaCr_3O_8$ | |
| I [1] | 4 | 2 | $Na_2Cr_2O_7 \cdot 2H_2O$, 10 | 173–263 | 1 | 0.25 | $NaCr_3O_8$ | |
| J | 2 | 1 | $Na_2Cr_2O_7 \cdot 2H_2O$, 5; +0.5 g. $H_2O$ | 350 | 1,000 | 6 | $CrO_2$ | 8, 0.2. |
| K | 2 | 1 | $K_2Cr_2O_7$+0.6 g. $H_2O$, 5 | 400 | 1,000 | 6 | $CrO_2$ | 6, 0.25. |
| L | 2 | 1 | $Na_2Cr_2O_7 \cdot 2H_2O$, 5 | 400 | 1,000 | 6 | $CrO_2$ | 25, 0.5. |

[1] These preparations were carried out in an atmosphere of flowing oxygen saturated with water at 92° C.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing an alkali metal chromium oxide $MCr_3O_8$ wherein M is lithium, sodium, potassium, rubidium or cesium which comprises heating a mixture of $CrO_3$, a reactive form of $Cr_2O_3$ and an alkali metal dichromate for at least 0.1 hour at a temperature in the range 170–400° C., any water present being in amount never more than two moles per mole of dichromate and, at above 350° C., always being less than two moles per mole of dichromate.

2. The process of claim 1 in which the ingredients are substantially anhydrous.

3. The process of claim 1 in which an excess of dichromate over that stoichiometrically required is employed.

4. The process of claim 1 in which the dichromate is that of sodium.

5. The process of claim 1 in which the dichromate is that of potassium.

6. The process of claim 1 accomplished in the presence of oxygen.

7. The process of claim 6 in which the oxygen is flowing.

References Cited

Slinkin et al., "Dorlady Akademii Nauk SSSR," vol. 150, No. 2, May 1963, pp. 328–330.

Suchow et al., "Journal of American Chemical Society," vol. 74, 1952, pp. 1678–1679.

Wilhelmi, "Acta Chemica Scandinavica," vol. 12, 1958, pp. 1965–1976.

H. T. CARTER, *Primary Examiner.*

U.S. Cl. X.R.

23—145